United States Patent
Schinabeck et al.

(10) Patent No.: US 7,238,760 B2
(45) Date of Patent: Jul. 3, 2007

(54) WATER-SOLUBLE OR WATER-SWELLABLE, ASSOCIATIVELY THICKENING COPOLYMERS CONTAINING SULFO GROUPS, METHOD FOR PRODUCING THE SAME AND USE THEREOF

(75) Inventors: Michael Schinabeck, Garching (DE); Gerhard Albrecht, Tacherting (DE); Alfred Kern, Kirchweidach (DE); Manfred Schuhbeck, Trostberg (DE); Michaela Melzer, Feichten (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 10/343,102

(22) PCT Filed: Aug. 2, 2001

(86) PCT No.: PCT/EP01/08938

§ 371 (c)(1),
(2), (4) Date: Jul. 11, 2003

(87) PCT Pub. No.: WO02/10229

PCT Pub. Date: Feb. 7, 2002

(65) Prior Publication Data

US 2004/0024154 A1 Feb. 5, 2004

(30) Foreign Application Priority Data

Aug. 2, 2000 (DE) ................ 100 37 629

(51) Int. Cl.
*C08F 26/08* (2006.01)
(52) U.S. Cl. ............ 526/288; 526/264; 526/287; 526/292.95; 526/307; 526/307.3; 526/307.7; 526/372; 526/320; 526/332; 524/804; 524/808; 524/818

(58) Field of Classification Search ........... 526/264, 526/287, 288, 292.95, 307, 307.3, 307.7, 526/372, 320, 332; 524/804, 808, 818
See application file for complete search history.

(56) References Cited

U.S. PATENT DOCUMENTS

| 4,608,425 A | 8/1986 | Peiffer et al. |
|---|---|---|
| 4,710,555 A | 12/1987 | Peiffer et al. |
| 5,068,278 A | 11/1991 | Peiffer et al. |
| 5,837,789 A * | 11/1998 | Stockhausen et al. ........ 526/320 |
| 5,985,944 A * | 11/1999 | Ishizaki et al. ............... 521/64 |
| 6,187,887 B1 * | 2/2001 | Albrecht et al. ............ 526/264 |
| 6,313,246 B1 * | 11/2001 | Carter et al. ................ 526/258 |
| 6,645,476 B1 * | 11/2003 | Morschhauser et al. ... 424/70.1 |
| 6,727,318 B1 * | 4/2004 | Mathauer et al. ........... 524/801 |
| 2003/0027964 A1 * | 2/2003 | Quadir et al. |

FOREIGN PATENT DOCUMENTS

EP 0 522 756 B1 * 1/1996

* cited by examiner

*Primary Examiner*—Helen L Pezzuto
(74) *Attorney, Agent, or Firm*—Fulbright & Jaworski L.L.P.

(57) ABSTRACT

The invention relates to water-soluble or water-swellable copolymers which contain sulfo groups and which are based on (meth)acrylamide-alkylsulfonic acids and (meth)acrylamide or N-vinyl compounds, and to their use as additives for aqueous construction materials systems or for water-based paint and coating systems. The inventive copolymers also represent water retention agents which are highly effective, even when used in relatively small quantities, and which are highly compatible in construction material and paint systems of this type.

27 Claims, No Drawings

WATER-SOLUBLE OR WATER-SWELLABLE, ASSOCIATIVELY THICKENING COPOLYMERS CONTAINING SULFO GROUPS, METHOD FOR PRODUCING THE SAME AND USE THEREOF

This application is a U.S. National Phase of PCT/EP01/08938 filed Aug. 2, 2001, incorporated herein by reference in its entirety.

The present invention relates to water-soluble or water-swellable, associatively thickening copolymers containing sulfo groups, methods for producing the same and the use of these copolymers in aqueous construction-material systems based on hydraulic binders, such as cement, lime, gypsum, anhydrite, etc., or else in water-based paint systems and water-based coating systems.

Aqueous construction-material mixtures usually use water-soluble non-ionic derivatives of polysaccharides, in particular cellulose derivatives and starch derivatives, in order to delay or prevent the undesirable evaporation of the water required for hydration and use, or the escape of this water into the ground.

The ability to control the water balance in paint systems, renders, adhesive mortars, troweling compounds and joint fillers, and also in spray concretes or tunnel construction and in underwater concretes by using these additives has wide-ranging practical consequences. Specifically, it has a decisive effect both on the properties of the construction material in its usage condition and on its properties in the hardened or dried condition. Through the central function of water retention, therefore, these additives also affect consistency (plasticity), open time, smoothability, segregation, tack, adhesion (to the ground and to the tooling), mechanical stability, and slip resistance, and also tensile bond strength and compressive strength or shrinkage.

According to Ullmann's Enzyklopadie der Technischen Chemie ($4^{th}$ edition, Volume 9, pages 208-210, Verlag Chemie Weinheim), the most commonly used water-retention agents are synthetically produced non-ionic derivatives of cellulose and of starch, for example methyl cellulose (MC), hydroxyethyl cellulose (HEC), hydroxyethylmethyl cellulose (HEMC). However, use is also made of microbially produced polysaccharides, such as Welan gum, and naturally occurring extractively isolated polysaccharides (hydrocolloids), such as alginates, xanthans, caragheenans, galactomannans, etc., and these are used in the prior art to regulate the water balance and the rheology of aqueous construction-material systems and aqueous paint systems.

A disadvantage with these products is the use, in the production process, of raw materials which are known to be physiologically hazardous, for example ethylene oxide, propylene oxide, and methyl chloride.

A number of publications, such as DE-A 39 34 870, describe the use of non-ionic cellulose derivatives in the construction-material and paint sector. These products have low thermal flocculation points, the result being a drastic reduction in water-retention ability at temperatures above 30° C. The rheological property profile of these products is moreover inadequate in paint systems, since the additives provide insufficient adsorptive forces to disperse the pigments. These problems can be solved by using cellulose ethers which contain ionic groups.

For example U.S. Pat. No. 5,372,642 describes methylhydroxyalkylcarboxymethylcelluloses which in lime- and cement-containing mixtures give no fall-off in water retention when the usage temperature is increased from 20 to 40° C.

U.S. Pat. No. 5,863,975 moreover describes synthetic polymers which have water-retention properties and contain monomers containing carboxyl groups, for example acrylic acid. Due to the carboxylate groups, they, like the methylhydroxyalkylcarboxymethylcelluloses, markedly delay hardening in hydraulic binders.

In addition, there is a possibility of general incompatibility with polyvalent cations, such as $Ca^{2+}$ and $Al^{3+}$, and this can lead to flocculative precipitation and thus to ineffectiveness of these products.

Sulfoalkylated cellulose derivatives are described in EP-A 554 749, inter alia. They, like the polyelectrolytes according to DE-A 198 06 482 containing sulfo groups, have excellent compatibility with polyvalent cations, when compared with products containing carboxy groups.

However, unlike the polymers according to DE-A 198 06 482 containing sulfo groups, the sulfoalkylated cellulose derivatives exhibit marked setting-delay properties when used in adhesive mortars and renders.

The polyelectrolyte properties of all long-chain ionic polymers, whether cellulose-based or synthetically prepared, bring about high viscosities in solutions with low salt concentration. If, however, the salt content is higher the viscosity falls away markedly.

The following problem arises specifically in construction-material mixtures which comprise hydraulic binders and other ionic additives: if the construction-material mixtures which comprise these polyelectrolytes are freshly mixed the resultant viscosity is high. After an aging period of from 5 to 10 min, the high salt concentration in the aqueous phase of the mixed construction-material mixture brings about a fall in viscosity. In adhesive mortars, these products give inadequate mechanical stability, in particular when the tiles used are heavy. In addition, a significant requirement of the user of these products is constant usage consistency over a realistic usage period.

Another disadvantage of construction-material systems containing polyelectrolyte is the incompatibility and destabilization of the air-pore formers present in the construction-material systems (renders). It is therefore impossible to produce products with high air-pore content, e.g. renders for restoration work, since the usage properties required are greatly dependent on air-pore content and air-pore distribution.

Other difficulties with the polyelectrolytes according to DE-A 198 06 482 containing sulfo groups arise in preparing the polymers in the form of gel polymers. Polymerization using gel polymerization technology mostly gives a gel block which has to be comminuted to permit effective drying of the polymer.

For the gel block to be capable of comminution, the consistency of the gel block is very important. Only if the chain lengths are very high is the gel sufficiently hard to permit cutting of the gel block. Otherwise, comminution is possible only with great difficulty and at high technical cost.

Even in combination with a release agent, the gel granules produced tend to cake, making further processing (conveying and drying) problematic. Gel polymerization technology can be used only with difficulty and at high technical cost.

The present invention was therefore based on the object of developing water-soluble or water-swellable copolymers which do not have the disadvantages mentioned of the prior art, but are effective even at comparatively high temperatures, and exhibit properties which give constant thickening even at high electrolyte content, and also can be produced by a simple method with good reproducibility by the gel polymerization method, and moreover give the construction-material systems and paint systems excellent performance characteristics during usage and in the hardened or dried state.

According to the invention, this object has been achieved by way of the copolymers corresponding to claim 1.

Indeed, it has surprisingly been found that the copolymers of the invention are highly effective water-retention agents with good compatibility in construction-material systems and paint systems, even when the amounts used are relatively small, and together with this have improved properties when compared with products currently used. Furthermore, the amphiphilic character of the polymers and the hydrophobicized side chains permit a marked improvement in water retention and controlled adjustment of thickening properties. Even at high salt concentrations, it is possible to achieve a realistic consistent usage consistency. These effects, too, were certainly not predictable.

The copolymers of the present invention are composed of at least four units a), b), c), and d). The first unit is a substituted acrylic or methacrylic derivative containing sulfo groups and having the formula I:

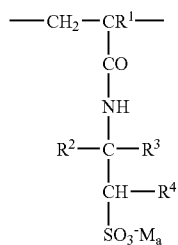

where $R^1$=hydrogen or methyl, $R^2$, $R^3$, $R^4$=hydrogen, an aliphatic hydrocarbon radical having from 1 to 6 carbon atoms, a phenyl radical which is unsubstituted or substituted with from 1 to 5, preferably up to 3, methyl groups, and M=hydrogen, a mono- or divalent metal cation, ammonium, or an organic amine radical, and a=½ or 1. The mono- or divalent metal cation used is preferably alkali metal ions or/and alkaline earth metal ions and in particular sodium ions, potassium ions, calcium ions, or magnesium ions. The organic amine radicals used are preferably substituted ammonium groups which derive from primary, secondary, or tertiary amines having $C_1$-$C_{20}$-alkyl, $C_1$-$C_{20}$-alkanol, $C_5$-$C_8$-cycloalkyl, or/and $C_6$-$C_{14}$-aryl radicals. Examples of appropriate amines are methylamine, dimethylamine, trimethylamine, ethanolamine, diethanolamine, triethanolamine, cyclohexylamine, dicyclohexylamine, phenylamine, and diphenylamine, each of which in the protonated ammonium form provides an organic amine radical as radical M of the invention.

The unit a) derives from monomers such as 2-acrylamido-2-methylpropanesulfonic acid, 2-methylacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid. 2-Acrylamido-2-methylpropanesulfonic acid is particularly preferred.

The second unit b) corresponds to the formula IIa) and/or IIb):

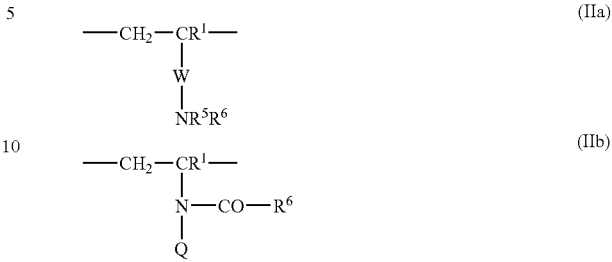

where W=—CO—, —CO—O—$(CH_2)_x$—, —CO—$NR^2$—$(CH_2)_x$—
  x=from 1 to 6 and
  $R^1$ and $R^2$ are as defined above.
$R^5$ and $R^6$ are, independently of one another, hydrogen, an aliphatic hydrocarbon radical having from 1 to 20 carbon atoms, a cycloaliphatic hydrocarbon radical having from 5 to 8 carbon atoms, or an aryl radical having from 6 to 14 carbon atoms. Where appropriate, these radicals may have substitution with hydroxyl, carboxyl, or sulfonic acid groups.
Q in formula IIb) is hydrogen or —$CHR^5R^7$. If Q≠H, $R^5$ and $R^6$ in structure IIb) may also together be a —$CH_2$—$(CH_2)_y$-methylene group, where y=from 1 to 4, and these form a five- to eight-membered heterocyclic ring when the remainder of the formula IIb) is included

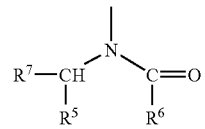

$R^7$ may be a hydrogen atom, a $C_1$-$C_4$-alkyl radical, a carboxylic acid group, or a carboxylate group —$COOM_a$, where M and a are as defined above.

Preferred monomers which may be used and have the structure IIa) are the following compounds: acrylamide, methacrylamide, N-methacrylamide, N,N-dimethylacrylamide, N-ethylacrylamide, N-cyclohexylacrylamide, N-benzylacrylamide, N-methylolacrylamide, N-tert-butylacrylamide, etc. Examples of monomers on which the structure IIb) is based are N-methyl-N-vinyl-formamide, N-methyl-N-vinylacetamide, N-vinylpyrrolidone, N-vinyl-caprolactam, N-vinylpyrrolidone-5-carboxylic acid, etc.

The third unit c) corresponds to the formulae IIIa and/or IIIb

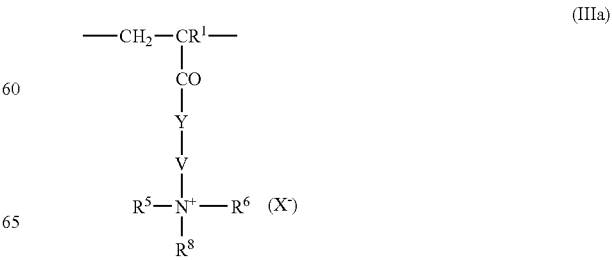

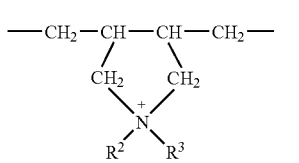 (IIIb)

where Y=O, NH or NR$^5$
V=—(CH$_2$)$_x$—,

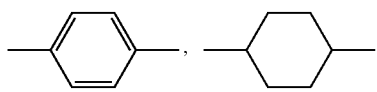

R$^8$=R$^5$ or R$^6$, —(CH$_2$)$_x$—SO$_3^-$(M),

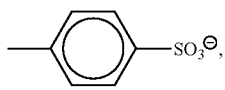

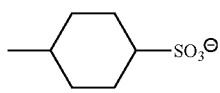

X=halogen, (preferably Cl, Br), C$_1$-C$_4$-alkyl sulfate (preferably methyl sulfate) or C$_1$-C$_4$alkylsulfonate and
R$^1$, R$^2$, R$^3$, R$^5$, R$^6$, and x are as defined above.

Examples of preferred monomers which may be used and form the structure (IIIa) are: [2-(acryloyloxy)ethyl]trimethylammonium chloride, [2-(acryloylamino)ethyl]trimethylammonium chloride, [2-(acryloyloxy)ethyl]trimethylammonium methosulfate, [2-(methacryloyloxy)ethyl]trimethylammonium chloride or methosulfate, [3-(methacryloylamino)propyl]trimethyl-ammonium chloride, N-(3-sulfopropyl)-N-methacryloxyethyl-N'-N-dimethylammonium betaine, N-(3-sulfopropyl)-N-methyacrylamidopropyl-N,N-dimethylammonium betaine, and 1-(3-sulfopropyl)-2-vinylpyridinium betaine.

Examples of monomers on which the structure IIIb is based are N,N-dimethyldiallylammonium chloride and N,N-diethyldiallylammonium chloride.

The fourth unit d) corresponds to the formula IV

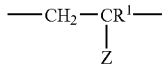 (IV)

where Z=—COO(C$_m$H$_{2m}$O)$_n$—R$^9$, —(CH$_2$)$_p$—O(C$_m$H$_{2m}$O)$_n$—R$^9$ R$^9$ = 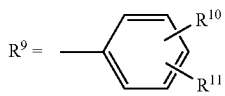

or else a saturated or unsaturated, linear or branched, aliphatic hydrocarbon radical having from 22 to 40 carbon atoms R$^{10}$=H, C$_1$-C$_4$-alkyl-, phenyl-, benzyl-, C$_1$-C$_4$-alkoxy, halogen (F, Cl, Br, I), cyano, —COOH, —COOR$^5$, —CO—NH$_2$, —OCOR$^5$ R$^{11}$=arylalkyl group having a C$_1$-C$_{12}$-alkyl radical and C$_6$-C$_{14}$-aryl radical m=from 2 to 4
n=from 0 to 200
p=from 0 to 20 and R$^1$ and R$^5$ are as defined above.

Preferred monomers which form the structure IV are tristyrylpolyethylene glycol 1100 methacrylate, behenylpolyethylene glycol 1100 methacrylate, tristyrylpolyethylene glycol 1100 acrylate, tristyrylpolyethene glycol 1100 monovinyl ether, behenylpolyethene glycol 1100 monovinyl ether, phenyltriethylene glycol acrylate, tristyrylpolyethylene glycol 1100 vinyloxybutyl ether, behenylpolyethylene glycol 1100 vinyloxybutyl ether, tristyrylpolyethylene glycol-block-propylene glycol allyl ether, behenylpolyethylene glycol-block-propylene glycol allyl ether, etc.

It is important for the invention that the copolymers are composed of from 3 to 96 mol % of the unit a), from 3 to 96 mol % of the unit b), and from 0.05 to 75 mol % of the unit c), from 0.01 to 30 mol % of the unit d). Polymers whose use is preferred contain from 40 to 80 mol % of a), from 15 to 55 mol % of b), from 2 to 30 mol % of c), and from 0.3 to 10 mol % of d).

The number of structural repeat units in the copolymers of the invention is unrestricted and is very highly dependent on the respective application sector. However, it has proven advantageous to adjust the number of structural units so that the copolymers have a number-average molecular weight of from 50 000 to 20 000 000, preferably from 500 000 to 10 000 000, in particular up to 8 000 000.

The copolymers of the invention are prepared in a manner known per se by using free-radical, ionic, or complex-coordinative bulk, solution, gel, emulsion, dispersion or suspension polymerization to link the monomers forming the structures a) to d). Since the products of the invention are water-soluble copolymers, preference is given to polymerization in the aqueous phase, polymerization in inverse emulsion or polymerization in inverse suspension. In a particularly preferred embodiment, the reaction is a gel polymerization or an inverse suspension polymerization in organic solvents.

If the process is carried out in an aqueous phase, gel polymerization is preferred, especially for the preparation of copolymers in the upper molecular-weight range (e.g. ≧1 000 000, in particular ≧10 000 000 Da), these being the materials used in adhesive mortars and in underwater concrete, for example. The use of the monomers derived from the unit d) dramatically improves the ease of comminuting and processing the gel, even at low degrees of polymerization, and gel polymerization is therefore the preferred embodiment, for reasons of cost-effectiveness.

Solution polymerization is less cost-effective due to extremely high solution viscosities of these high-molecular-weight products and the high resultant cost. However, the preparation of copolymers of the invention whose molecular weight is in the lower or central range (e.g. up to 5 000 000 Da) (useful in flowable screeds as anti-segregation agents and thickeners in paint systems) may in contrast readily take the form of an aqueous solution polymerization.

The monomers are reacted here in particular at temperatures of from −20 to 250° C., at a concentration of from 5 to 20% by weight, and at a pH of from 4 to 9. The polymerization preferably takes place at from 5 to 120° C. with the aid of conventional free-radical initiators, such as hydrogen peroxide, sodium peroxodisulfate, potassium peroxodisulfate, or ammonium peroxodisulfate, dibenzoyl peroxide, 2,2'-azobis(2-amidinopropane) dihydrochloride, azobis (isobutyronitrile)tert-butyl hydroperoxide, or by a physical route via irradiation, or electrochemically. It is also possible to combine the abovementioned initiators with reducing agents, such as dibutylamine hydrochloride, Na hydroxymethanesulfinate dihydrate, alkali metal sulfites and alkali metal metabisulfites, thiourea, transition metal salts present in the reduced form, for example iron (2) sulfate heptahydrate, etc., giving redox systems.

In the case of the gel polymerization, the water-soluble azo initiators may be initiated either thermally or else photochemically. A combination of both is preferred.

It is also possible to use other auxiliaries, such as molecular weight regulators, e.g. thioglycolic acid, mercaptoethanol, formic acid, and sodium hypophosphite.

It can sometimes be necessary to obtain polymers with a high degree of polymerization and a low degree of crosslinking, since these parameters have a decisive effect on the water-retention capability and high and constant viscosity.

This is successful by way of the preferred gel polymerization when the polymerization is carried out at low reaction temperatures and with a suitable initiator system. A conversion of ≧99% can be achieved via the combination of two initiator systems (azo initiators and redox system) which are first initiated photochemically at low temperatures and then initiated thermally due to the exothermic nature of the polymerization.

Rapid drying under mild conditions avoids crosslinking side reactions and provides constant product quality.

The associatively thickening monomers of the unit d) are moreover needed at at least 0.3 mol %, since they have a major effect on the properties of the gel block.

The hydrophobic monomers harden the gel block sufficiently to improve its ease of comminution. Combination with a release agent (e.g. Sitren 595 from Goldschmidt) moreover prevents caking of the gel granules.

The flowable gel particles are therefore easier to distribute on a drying grid. This makes the drying process easier and indeed the drying times can be shortened.

The gel polymerization preferably takes place at from −5 to 50° C., the concentration of the aqueous solution preferably being adjusted to from 40 to 70% by weight. To carry out the polymerization in one preferred embodiment, the sulfoalkylacrylamide in the form of its commercially available acid form is dissolved in water, neutralized by adding an alkali metal hydroxide, and mixed, with agitation, with other monomers to be used according to the invention, and also with buffers, molecular weight regulators, and other polymerization auxiliaries. Once the pH has been adjusted, preferably being from 4 to 9, the mixture is flushed with an inert gas, such as helium or nitrogen, and that is followed by heating or cooling to the appropriate polymerization temperature. If the chosen embodiment is gel polymerization without agitation, preferred layers of thickness from 2 to 20 cm, in particular from 8 to 10 cm, are polymerized under adiabatic reaction conditions. The polymerization is initiated by adding the polymerization initiator and by irradiation with UV light at low temperatures (from −5 to 10° C.). Once the monomers have been completely converted, the polymer is comminuted using a release agent (Sitren 595 from Goldschmidt) in order to provide a larger surface area to accelerate drying.

The dried copolymers are in dried form when used according to the invention. Since the reaction conditions and drying conditions are very mild, crosslinking side-reactions can be avoided, and polymers are therefore obtained which have a very low gel content.

In another preferred embodiment, the copolymerization is an inverse suspension polymerization of the aqueous monomer phase in an organic solvent. The procedure here is preferably that the monomer mixture dissolved in water and, where appropriate, neutralized is polymerized in the presence of an organic solvent in which the aqueous monomer phase has no, or low, solubility. Operations are preferably carried out in the presence of "water in oil" emulsifers (W/O emulsifiers) and/or protective colloids based on low- or high-molecular-weight compounds, used in proportions of from 0.05 to 20% by weight, based on the monomers. Examples of these stabilizers are hydroxypropylcellulose, ethylcellulose, methylcellulose, cellulose acetate butyrate mixed ethers, copolymers of ethylene and vinyl acetate, styrene and butyl acrylates, polyoxyethylene sorbitan monooleate, -laurate, or -stearate, block copolymers of propylene oxide and ethylene oxide, etc.

Examples of organic solvents which may be used are linear aliphatic hydrocarbons, such as n-pentane, n-hexane, n-heptane, branched aliphatic hydrocarbons (isoparaffins), cycloaliphatic hydrocarbons, such as cyclohexane and decalin, and also aromatic hydrocarbons such as benzene, toluene, and xylene. Other suitable materials are alcohols, ketones, carboxylic esters, nitro compounds, halogenated hydrocarbons, ethers, and many other solvents. Preference is given to organic solvents which form azeotropic mixtures with water.

The water-soluble or water-swellable copolymers are initially produced in solution in the form of finely dispersed aqueous droplets in the organic suspension medium, and are preferably isolated in the form of solid spherical particles in the organic suspension medium, by removing the water. After removal of the suspension medium and drying, a granular solid remains and is used according to the invention either directly or after grinding.

The polymer compounds of the invention have excellent suitability as additives for aqueous construction-material systems which comprise hydraulic binders, such as cement, lime, gypsum, anhydrite, etc. They are also useful in water-based paint systems and water-based coating systems.

The amounts preferably used of the copolymers of the invention depend on the type of use and are from 0.05 to 5% by weight, based on the dry weight of the construction-material system, paint system, or coating system.

The copolymers have excellent water-retention properties, even at relatively high usage temperatures, and provide excellent performance characteristics for pigmented paints, renders, adhesive mortars, troweling compounds, joint fillers, spray concrete, underwater concrete, petroleum-drilling cements, etc., both during use and in the hardened or dried state. A particular feature of the polymers is that, even at high electrolyte concentration, they can be used in the construction-material mixtures for precise adjustment of thickening properties via chain length, charge density, amphiphilic character, and hydrophobic side chains. In concrete and self-leveling screeds and other flowable leveling compounds, small added amounts of the polymers serve as stabilizers and antisegregation agents.

Water-soluble or water-swellable copolymers containing sulfo groups and based on (meth)acrylamide alkylsulfonic acids and (meth)acrylamide or N-vinyl compounds are described, as is their use as additives for aqueous construction-material systems or for water-based paint systems and water-based coating systems. The copolymers of the invention are highly effective and compatible water-retention agents in these construction-material systems and paint systems, even when the amounts used are relatively small.

The following examples are intended to provide illustration of the invention.

EXAMPLES

Example 1

Gel Polymerization 400 g of water form an initial charge in a 1 l three-necked flask with stirrer and thermometer. 87 g of flaked sodium hydroxide are dissolved, with stirring, and 450 g (2.17 mol) of 2-acrylamido-2-methylpropane-sulfonic acid are slowly added and stirred until a clear solution is obtained. After addition of 0.50 g of citric acid hydrate, with 5% strength by weight aqueous sodium hydroxide solution is added with stirring and cooling, and a pH of 4.60 is established. 83 g (0.83 mol) of N,N-dimethylacrylamide, 55 g (0.12 mol) of [2-(methacrylamido)-propyl]trimethylammonium chloride (50% strength by weight solution in water), and 8.6 g of (0.023 mol) tristyrylpolyethylene glycol 1100 methacrylate (Sipomer SEM 25 from Rhodia; having 25 ethylene glycol units) were then added in succession, whereupon the pH fell to 3. The solution was adjusted to pH=6.0 using 20% strength sodium hydroxide solution and inertized by flushing with nitrogen for 30 minutes, and cooled to about 5° C. The solution is transferred to a plastic container with dimensions (w*d*h) 15 cm*10 cm*20 cm, and then 150 mg of 2,2'-azobis(2-amidinopropane)dihydrochloride, 1.0 g of 1% Rongalit solution, and 10 g of 0.1% strength tert-butyl hydroperoxide solution were added in succession. The polymerization is initiated by irradiation with UV light (two Philips tubes; Cleo Performance 40 W). After about 2-3 h, the hard gel is removed from the plastic container and cut into gel cubes of dimensions about 5 cm*5 cm*5 cm, using scissors. Prior to comminution of the gel cubes by means of a conventional mincer, they are coated with the release agent Sitren 595 (polydimethylsiloxane emulsion; Goldschmidt). The release agent is a polydimethylsiloxane emulsion which was diluted 1:20 with water.

The resultant granulated gel is distributed uniformly on drying grids and dried in a circulating-air drying cabinet at from about 90 to 120° C. in vacuum, to constant weight.

This gave about 500 g of hard white granules, which were pulverized with the aid of a centrifugal mill.

Example 2

Inverse Suspension Polymerization 200 g of cyclohexane and 1.50 g of ethylcellulose (ethoxyl content about 48.5%, degree of substitution about 2.50) formed an initial charge in a 500 ml four-necked flask with thermometer, stirrer, reflux condenser, and inert gas attachment. After 30 minutes of inertization, the reactor contents were brought to the reflux temperature of 80° C., and an aqueous solution of 38.80 g (0.1872 mol) of 2-acrylamido-2-methyl-propanesulfonic acid, 6.30 g (0.0636 mol) of N,N-dimethylacrylamide, 4.05 (0.0092 mol) of [3-(methacryloylamino)propyl]trimethylammonium chloride (50% by weight in water), 1.1 g (0.003 mol) of tristyrylpolyethylene glycol 1100 methacrylate (SEM 25), 35.95 g of 20% strength by weight aqueous sodium hydroxide solution, 0.012 g of 2,2'-azobis(2-amidinopropane) dihydrochloride, and 5 g of water were added over a period of one hour. After the addition had ended, vigorous stirring was continued at from 75 to 80° C. for a further 2.5 hours, and the water was then removed azeotropically over a period of about 2 hours. After cooling to room temperature, the solid was filtered off in the form of spherical particles, washed with a little cyclohexane, and dried in vacuo.

This gave 54.3 g of fine glassy granules which were ground to give a fine white powder.

Other Examples

The procedure was carried out as described in Example 1 (gel polymerization), but using the polymerization mixture given in Table 1:

TABLE 1

| | | | | Monomer unit | | | |
|---|---|---|---|---|---|---|---|
| | a) | Sodium hydroxide solution | Water | b) | c) | d) | Yield |
| Example 3 | 2-Acrylamido-2-methylpropane sulfonic acid | 50% strength by weight aqueous sodium hydroxide solution | | Acrylamide (50% strength in water) | [2-(Methacrylamido)-propyl]trimethyl-ammonium chloride (50% by weight in water) | Tristyrylpoly-ethylene glycol 1100 methacrylate (SEM 25) | |
| | 343.00 g (1.66 mol) | 132.50 g | 224 g | 246.00 g (1.73 mol) | 49.0 g (0.11 mol) | 8.6 g (0.023 mol) | 530 g |
| Example 4 | 2-Acrylamido-2-methylpropane sulfonic acid | 50% strength by weight aqueous sodium hydroxide solution | | N,N-Dimethyl-aminopropyl acrylamide | [2-(Methacrylamido)-propyl]trimethyl-ammonium chloride (50% by weight in water) | Tristyrylpoly-ethylene glycol 1100 methacrylate (SEM 25) | |
| | 343.00 g (1.66 mol) | 132.50 g | 224 g | 83 g (0.52 mol) | 49.0 g (0.11 mol) | 8.6 g (0.023 mol) | 510 g |

TABLE 1-continued

| | a) | Sodium hydroxide solution | Water | b) | c) | d) | Yield |
|---|---|---|---|---|---|---|---|
| Example 5 | 2-Acrylamido-2-methylpropane sulfonic acid | 50% strength by weight aqueous sodium hydroxide solution | | N,N-Dimethyl-acrylamide | N,N-Dimethyl-diallylammonium chloride (60% strength) | Tristyrylpoly-ethylene glycol 1100 methacrylate (SEM 25) | |
| | 343.00 g (1.66 mol) | 132.50 g | 224 g | 83 g (0.83 mol) | 48.0 g (3.7 mol) | 8.6 g (0.023 mol) | 502 g |
| Example 6 | 2-Acrylamido-2-methylpropane sulfonic acid | 50% strength by weight aqueous sodium hydroxide solution | | N,N-Dimethyl-aminopropy acrylamide | [2-(Acrylamido)-propyl]trimethyl-ammonium chloride (60% by weight in water) | Tristyrylpoly-ethylene glycol 1100 methacrylate (SEM 25) | |
| | 338.00 g (1.63 mol) | 130.50 g | 300 g | 135.00 g (0.85 mol) | 90.0 g (0.27 mol) | 6.5 g (0.0023 mol) | 530 g |
| Example 7 | 2-Acrylamido-2-methylpropane sulfonic acid | 50% strength by weight aqueous sodium hydroxide solution | | N,N-Dimethyl-diallylacrylamide | N,N-Dimethyl-diallylammonium chloride (60% strength) | Behenylethylene glycol 1100 methacrylate (Sipomer BEM; Rhodia) | |
| | 343.00 g (1.66 mol) | 132.50 g | 224 g | 83 g (0.83 mol) | 48 g (3.7 mol) | 5.3 g (0.0017 mol) | 502 g |
| Example 8 | 2-Acrylamido-2-methylpropane sulfonic acid | 50% strength by weight aqueous sodium hydroxide solution | | N,N-Dimethyl-acrylamide | N,N-Dimethyl-diallylammonium chloride (60% strength) | Tristyrylpoly-ethylene glycol 1100 methacrylate (SEM 25) | |
| | 343.00 g (1.66 mol) | 132.50 g | 224 g | 83 g (0.83 mol) | 48 g (3.7 mol) | 19.5 g (0.0069 mol) | 502 g |
| Example 9 | 2-Acrylamido-2-methylpropane sulfonic acid | 50% strength by weight aqueous sodium hydroxide solution | | N,N-Dimethyl-acrylamide | Methacrylamido-propyldimethyl-ammonium sulfobetaine (MAAB) | Tristyrylpoly-ethylene glycol 1100 methacrylate (SEM 25) | |
| | 334.00 g (1.61 mol) | 129.0 g | 381 | 75 g (0.74 mol) | 75.0 g (0.28 mol) | 6.0 g (0.0021 mol) | 502 g |
| Comparative Example 1 | 2-Acrylamido-2-methylpropane sulfonic acid | 50% strength by weight aqueous sodium hydroxide solution | | N,N-Dimethyl-acrylamide | [2-(Methacrylamido)-propyl]trimethyl-ammonium chloride | Methylpoly-ethylene glycol 1100 methacrylate | |
| | 343.00 g (1.66 mol) | 132.50 g | 224 g | 83 g (0.52 mol) | 49.0 g (0.11 mol) | 3.97 g (0.0047 mol) | 502 g |

Comparative Example 2

Inverse Suspension Polymerization

Using a method based on Example 2, a mixture of the following composition was polymerized by the inverse suspension polymerization process:

An aqueous solution of 38.80 g (0.1872 mol) of 2-acrylamido-2-methylpropanesulfonic acid, 6.30 g (0.0636 mol) of N,N-dimethylacrylamide, 4.05 (0.0092 mol) of [3-(methacryloylamino)propyl]trimethylammonium chloride (50% by weight in water), 1.99 g (0.004 mol) of methylpolyethylene glycol 500 monovinyl ether, 35.95 g of 20% by weight aqueous sodium hydroxide solution, 0.012 g of 2,2'-azobis(2-amidinopropane) dihydrochloride, and 5 g of water is added to the organic solvent.

The usual drying and work-up gave 51.2 g of fine glassy granules, which were ground to give a fine white powder.

Comparative Example 3

Commercially available methylhydroxypropylcellulose with a solution viscosity of 790 mm$^2$/s (measured in the form of a 1% strength aqueous solution at 20° C. by the Ubbelohde method).

Table 2 gives the comminution properties and the necessary drying times. It is clearly seen that incorporation of the unit c) into the polymers permits milder drying conditions and shorter drying times in comparison with Comparative Example 1. The residual moisture level of the ground powder is a measure of the extent of completion of the drying process.

The gel content of the polymer is defined as the insoluble gel particles produced by side reactions during the polymerization or the drying process. To determine this, 1 liter of a 0.1% strength aqueous solution is prepared. The solution is poured onto a metal screen (0.5 mm) and then washed with 2 l of water. The gel content remaining in the screen is transferred to a measuring cylinder and the volume is determined.

TABLE 2

| Gel properties | | Drying | | Residual moisture level [%] | Gel content [ml] |
|---|---|---|---|---|---|
| | | Temperature [° C.] | time [min] | | |
| Example 1 | very hard small particles with good flowability | 80 | 100 | 3 | 30 |
| Example 3 | as in Example 1 | 80 | 90 | 5 | 50 |
| Example 4 | as in Example 1 | 120 | 60 | 8 | 80 |
| Example 5 | as in Example 1 | 100 | 70 | 3 | 40 |
| Example 6 | as in Example 1 | 100 | 60 | 7 | 45 |
| Example 7 | hard flowable particles | 80 | 100 | 5 | 60 |
| Example 8 | very hard the particles are markedly smaller than given for Example 1 | 80 | 70 | 5 | 55 |
| Example 9 | hard the particles are markedly smaller than given for Example 1 | 80 | 65 | 5 | 40 |
| Example 2 | | | | 4 | 150 |
| Comparative Example 1 | soft gel; difficult to comminute; the gel particles conglutinate again to give clumps | 150 | 240 | 15 | 250 |
| Comparative Example 2 | | | | 6 | 280 |

Table 3 gives solution viscosities of 0.5% strength aqueous solutions, with and without addition of 1 and 2% of sodium sulfate.

It is clearly seen that the viscosities of the polymer solutions when electrolyte is added are higher in comparison with the comparative example, although the viscosities without salt addition are at the same level. The more of the associatively thickening monomer incorporated in the polymer, the smaller the fall in the viscosity under the action of electrolyte. Example 5 also shows lower electrolyte sensitivity in comparison with Example 1.

TABLE 3

| | [mPAS*s}* | | |
|---|---|---|---|
| | Viscosity of 0.5% strength soln. | Viscosity of 0.5% strength soln. with 1% of sodium sulfate | Viscosity of 0.5% strength soln. with 2% of sodium sulfate |
| Example 1 | 3557 | 1332 | 1230 |
| Example 2 | 2512 | 1005 | 988 |
| Example 3 | 3250 | 1198 | 1058 |
| Example 4 | 2400 | 1056 | 987 |
| Example 5 | 3641 | 2132 | 2102 |

TABLE 3-continued

| | [mPAS*s}* | | |
|---|---|---|---|
| | Viscosity of 0.5% strength soln. | Viscosity of 0.5% strength soln. with 1% of sodium sulfate | Viscosity of 0.5% strength soln. with 2% of sodium sulfate |
| Example 6 | 2631 | 1156 | 1104 |
| Example 7 | 3868 | 2563 | 2498 |
| Example 8 | 4531 | 4690 | 4720 |
| Example 9 | 3738 | 3645 | 3701 |
| Comparative Example 1 | 3747 | 106 | 87 |
| Comparative Example 2 | 2280 | 45 | 62 |

*20° C., Brookfield, in $H_2O$ (Measured at 5 revolutions per minute)

Application Examples

The performance-related assessment of the copolymers of the invention used a tile-adhesive mortar test mixture.

This practical test used a ready-mixed dry formulation with the additives of the invention or the comparative products admixed in solid form. Following drying mixing, a certain amount of water was added, and vigorous stirring was carried out (duration 2*15 seconds) by means of a drill with G3 mixer. The mixture with water was then permitted to age for 5 min and was subjected to a first visual check. The standardized determination of consistency (slump to DIN 18555, Part 2) then followed immediately after the ageing period, and for a second time 30 min after the mixing with water (after brief manual stirring). Water retention is determined about 15 min after mixing with water to DIN 18555, Part 7.

The composition of the tile-adhesive mortar can be seen in Table 4.

The results obtained are presented in Tables 5 and 6.

TABLE 4

Composition of test mixture (in % by weight)

| Component | Amount |
|---|---|
| Portland cement | 36.00[1] |
| Quartz sand (from 0.05 to 0.4 mm) | 56.90 |
| White pigment[3] | 5.50 |
| Cellulose fibers | 0.50 |
| Water-retention agent | 0.16 |

[1]CEM II 42.5 R
[3]Ulm white "Juraperle MHS"

TABLE 5

Usage properties of a ceramic-tile-adhesive mortar which was modified using polymers of the invention and polymers corresponding to the prior art.

| Additive (Example No.) | Amount of water (g) | Slump (cm) | Slump after 30 min (cm) | Air pores (% by volume) | Water retention (%) |
|---|---|---|---|---|---|
| 1 | 260 | 14.9 | 15.1 | 13.0 | 99.1 |
| 2 | 260 | 16.6 | 17.2 | 15.8 | 97.9 |
| 3 | 260 | 15.0 | 15.5 | 14.2 | 98.5 |
| 4 | 260 | 19.8 | 19.6 | 12.7 | 98.2 |
| 5 | 260 | 15.0 | 15.1 | 13.7 | 99.5 |

TABLE 5-continued

Usage properties of a ceramic-tile-adhesive mortar which was modified using polymers of the invention and polymers corresponding to the prior art.

| Additive (Example No.) | Amount of water (g) | Slump (cm) | Slump after 30 min (cm) | Air pores (% by volume) | Water retention (%) |
|---|---|---|---|---|---|
| 6 | 260 | 19.6 | 19.6 | 15.9 | 98.0 |
| 7 | 260 | 14.5 | 14.7 | 16.9 | 98.3 |
| 8 | 260 | 13.2 | 13.7 | 16.1 | 99.4 |
| 9 | 260 | 14.3 | 14.5 | 15.3 | 99.2 |
| Comparison 1 | 260 | 15.6 | 18.7 | 10.9 | 97.7 |
| Comparison 2 | 260 | 18.0 | 19.3 | 10 | 95.5 |
| Comparison 3 | 260 | 17.0 | 17.3 | 10 | 97.3 |

Addition: 0.16% by weight
Adhesive mortar: 1000 g

Finally, the water retention of the product of the invention was also determined at an increased usage temperature of 40° C., and compared with the results of the testing of conventional cellulose-based additives. For this, the dry mortar, the water for mixing, and the apparatus used were heated to 40° C. by pretreating lasting 6 hours. Table 6 shows the results of these tests.

TABLE 6

Water retention of copolymers of the invention in machine-rendering at an elevated temperature, in comparison with the prior art.

| | | 20° C. | | 40° C. | |
|---|---|---|---|---|---|
| Additive (Example No.) | Water (g) | Slump (cm) | WR* (%) | Slump (cm) | WR* (%) |
| 1 | 260 | 14.3 | 98.9 | 13.7 | 99.1 |
| 4 | 260 | 19.1 | 98.4 | 18.7 | 98.6 |
| 5 | 260 | 14.9 | 99.0 | 14.1 | 99.2 |
| 7 | 260 | 14.1 | 98.8 | 13.5 | 98.8 |
| 8 | 260 | 13.5 | 99.3 | 13.9 | 99.0 |
| 9 | 260 | 14.5 | 99.1 | 14.7 | 98.9 |
| Comparison 3 | 260 | 17.2 | 96.9 | 15.4 | 88.0 |

*Water retention (WR)
Addition: 0.16% by weight
Dry mortar: 1000 g

What is claimed is:

1. A water-soluble or water-swellable copolymer containing sulfo groups and comprising
   a) from 3 to 96 mol % of units of formula I

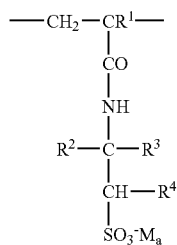

(I)

wherein $R^1$ is hydrogen or methyl;

$R^2$, $R^3$, $R^4$ are independently selected from hydrogen, an aliphatic hydrocarbon radical having from 1 to 6 carbon atoms, a phenyl radical, or a phenyl radical substituted with methyl groups;

M is hydrogen, a monvalent metal cation, a divalent metal cation, ammonium, or an organic amine radical;

a is 0.5 or 1;

b) from 3 to 96 mol % of units of at least one of formula IIa and IIb

(IIa)

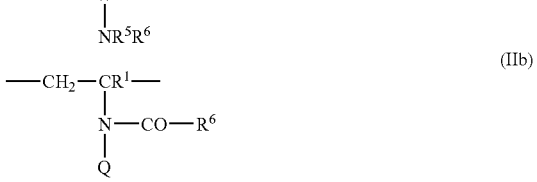

(IIb)

wherein W is —CO—, —CO—O—$(CH_2)_x$—, or —CO—$NR^2$—$(CH_2)_x$—wherein x is from 1 to 6;

$R^5$ and $R^6$ are independently selected from hydrogen, a $C_1$-$C_{20}$ substituted aliphatic hydrocarbon radical, a C1-C20 unsubstituted aliphatic hydrocarbon radical, a C5-C8 cycloaliphatic hydrocarbon radical, a C6-C14 aryl radical; and Q is hydrogen or —$CHR^5R^7$;

$R^7$ is hydrogen, an aliphatic hydrocarbon radical having from 1 to 4 carbon atoms; —COOH or —COO—$M_a$, and $R^1$, $R^2$, M and a are as defined above;

wherein if Q is not hydrogen, $R^5$ and $R^6$ in IIb can together form a —$CH_2$—$(CH_2)_y$-methylene group where y is from 1 to 4;

c) from 0.05 to 75 mol % of units of at least one of formulas IIIa and IIIb

(IIIa)

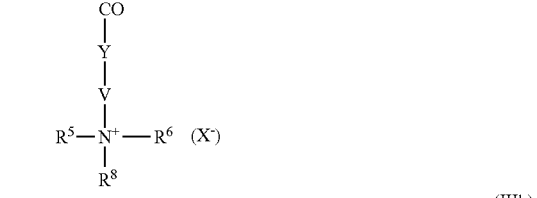

(IIIb)

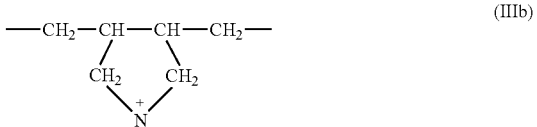

wherein Y is O, NH or $NR^5$;

V is —$(CH2)_x$—,

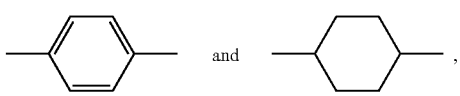

$R^8$ is $R^5$, $R^6$, —$(CH_2)_x$—$SO_3^-(M)$,

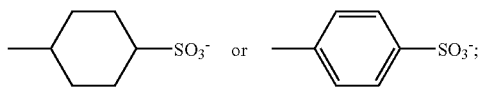

and

X is halogen, a $C_1$-$C_4$-alkyl sulfate or a $C_1$-$C_4$-alkylsulfonate;

$R^1$, $R^2$, $R^3$, $R^5$, $R^6$, and x are as defined above; and d) from 0.01 to 30 mol % of units of formula IV

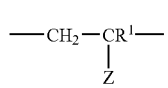

(IV)

wherein Z is —COO($C_mH_{2m}O$)$_n$—$R^9$, —($CH_2$)$_p$—O($C_mH_{2m}O$)$_n$—$R^9$, wherein $R^9$ is a saturated or unsaturated, linear or branched, aliphatic hydrocarbon radical having from 22 to 40 carbon atoms, or

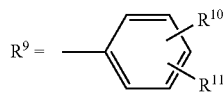

$R^{10}$ is H, $C_1$-$C_4$-alkyl-, phenyl-, benzyl-, $C_1$-$C_4$-alkoxy, halogen, cyano, —COOH, —COOR$^5$, —CO—NH$_2$, or —OCOR$^5$;

$R^{11}$ is an arylalkyl group having a $C_1$-$C_{12}$-alkyl radical and a $C_6$-$C_{14}$-aryl radical;

m is from 2 to 4;

n is from 0 to 200;

p is from 0 to 20;

and $R^1$ and $R^5$ are as defined above, wherein the copolymer is water-soluble or water swellable and contains sulfo groups.

2. The copolymer as claimed in claim 1, wherein the mono-or bivalent metal cation is selected from the group consisting of a sodium ion, a potassium ion, a calcium ion, and a magnesium ion.

3. The copolymer as claimed in claim 1, wherein the organic amine radicals are selected from the group consisting of substituted ammonium groups which are derived from primary, secondary, or tertiary $C_1$-$C_{20}$-alkylamines, $C_1$-$C_{20}$-alkanolamines, $C_5$-$C_8$-cycloalkylamines, and $C_6$-$C_{14}$-arylamines.

4. The copolymer as claimed in claim 1, wherein the hydrocarbon radicals or aryl radicals of $R^5$ and $R^6$ are also substituted with at least one of hydroxyl, carboxyl, and sulfonic acid.

5. The copolymer as claimed in claim 1, wherein X is selected from the group consisting of chlorine, bromine, sulfate, and methyl sulfate.

6. The copolymer as claimed in claim 1, comprising from 40 to 80 mol % of unit a), from 15 to 55 mol % of unit b), from 2 to 30 mol % of unit c), and from 0.5 to 10 mol % of unit d).

7. The copolymer as claimed in claim 1, having a number-average molecular weight of from 50,000 to 10,000,000.

8. A method for preparing the copolymers of claim 1, comprising polymerizing the copolymer by aqueous solvent polymerization, gel polymerization or an inverse suspension polymerization in organic solvents at temperatures of from −20 to 250° C., with free-radical initiators and optionally polymerizing auxiliaries.

9. The method as claimed in claim 8, wherein the aqueous solvent polymerization takes place at from 5 to 120° C.

10. The method as claimed in claim 8, wherein the pH ranges from 4 to 9.

11. The method as claimed in claim 8, wherein the aqueous gel polymerization is carried out at a temperature of from −5 to 50° C.

12. The method as claimed in claim 11, wherein the gel polymerization, the free-radical initiation is selected from thermal and photochemical.

13. The method as claimed in claim 11, wherein the gel polymerization is conducted without agitation in layers of polymerization solution of thickness from 2 to 20 cm.

14. The method as claimed in claim 11, wherein the resultant gel is comminuted.

15. The method as claimed in claim 8, wherein the inverse suspension polymerization is carried out in an organic solvent in the presence of at least one of a water-in-oil emulsifier or a protective colloid.

16. The method as claimed in claim 15, wherein the proportions of the at least one water-in-oil emulsifier or protective colloid are present in an amount of from 0.05 to 20% by weight, based on the monomers.

17. The method as claimed in claim 15, wherein the organic solvent comprises at least one of an aliphatic, cycloaliphatic and aromatic hydrocarbon.

18. A construction material comprising the copolymer as claimed in claim 1 and an hydraulic binder.

19. A paint comprising the copolymers as claimed in claim 1, water and pigment paint systems and water-based coating systems.

20. The construction material as claimed in claim 18, comprising from 0.05 to 5% by weight of the copolymer, based on the dry weight of the construction-material system.

21. The copolymer as claimed in claim 2, wherein the organic amine radicals are substituted ammonium groups from at least one of a primary, secondary, or tertiary $C_1$-$C_{20}$-alkylamine, a $C_1$-$C_{20}$-alkanolamine, a $C_5$-$C_8$-cycloalkylamine, or a $C_6$-$C_{14}$-arylamine.

22. The method as claimed in claim 12, wherein the gel polymerization is undertaken without agitation in layers of polymerization solution of thickness from 2 to 20 cm.

23. The method as claimed in claim 16, wherein the organic solvent comprises at least one of an aliphatic, cycloaliphatic or aromatic hydrocarbon.

24. The paint as claimed in claim 19, wherein the amount of the copolyrner ranges from 0.05 to 5% by weight, based on the dry weight of the paint.

25. A coating system comprising the copolymer of claim 1 and a coating material.

26. The coating system of claim 25, comprising 0.05 to 5% by weight of the copolymer based on dry weight.

27. The method of claim 14, wherein the resultant gel is comminuted with the aid of a release agent.

* * * * *